United States Patent [19]
Ilan et al.

[11] Patent Number: 6,023,529
[45] Date of Patent: Feb. 8, 2000

[54] HANDWRITTEN PATTERN RECOGNIZER WITH SELECTIVE FEATURE WEIGHTING

[75] Inventors: Gabriel Ilan, Tel Aviv; Jacob Goldberger, Givataim, both of Israel

[73] Assignee: Advanced Recognition Technologies, Inc., Menlo Park, Calif.

[21] Appl. No.: 08/528,293

[22] Filed: Sep. 14, 1995

[30] Foreign Application Priority Data

Sep. 22, 1994 [IL] Israel ........................................ 111039

[51] Int. Cl.[7] .............................. G06K 9/00; G06K 9/62; G06K 9/68; G06K 9/70
[52] U.S. Cl. ........................... 382/186; 382/224; 382/227
[58] Field of Search .................................... 382/186, 187, 382/224, 227, 190

[56] References Cited

U.S. PATENT DOCUMENTS

| | | | |
|---|---|---|---|
| 4,040,009 | 8/1977 | Kadota et al. | 340/146.3 AQ |
| 4,193,056 | 3/1980 | Morita et al. | 340/146.3 |
| 4,284,975 | 8/1981 | Odaka | 340/146.3 J |
| 4,531,231 | 7/1985 | Crane et al. | 382/13 |
| 4,607,386 | 8/1986 | Morita et al. | 382/13 |
| 4,718,102 | 1/1988 | Crane et al. | 382/13 |
| 4,972,499 | 11/1990 | Kurosawa | 382/227 |
| 5,048,100 | 9/1991 | Kupersteen | 382/224 |
| 5,125,039 | 6/1992 | Hawkins | 382/30 |
| 5,341,438 | 8/1994 | Clifford | 382/9 |
| 5,347,595 | 9/1994 | Bokser | 382/224 |
| 5,361,379 | 11/1994 | White | 382/36 |
| 5,392,363 | 2/1995 | Fujisaki et al. | 382/13 |
| 5,577,135 | 11/1996 | Grajski et al. | 382/187 |

*Primary Examiner*—Andrew W. Johns
*Assistant Examiner*—Monica S. Davis
*Attorney, Agent, or Firm*—Skjerven, Morrill, MacPherson, Franklin & Friel

[57] ABSTRACT

A handwritten pattern recognition system for recognizing an input pattern is provided. The system has a plurality of parameter determining units, each determining the value of a desired parameter for an input pattern to be recognized. The system also includes a pattern match determiner which produces match values for each parameter of the input pattern with its corresponding parameter of each reference parameter. The match determiner also produces an overall match value for each reference pattern. A pattern classifier selects the reference pattern whose parameter set is "closest", by some matching criterion, to that of the input pattern.

13 Claims, 5 Drawing Sheets

HANDWRITTEN PATTERN RECOGNIZER WITH SELECTIVE FEATURE WEIGHTING

FIELD OF THE INVENTION

The present invention relates to pattern recognition systems in general and to systems for recognizing handwritten patterns, such as letters, numbers and signatures, in particular.

BACKGROUND OF THE INVENTION

Various handwritten pattern recognition systems are known in the art and they have varying degrees of success at recognition. These systems typically assume some particular structure of the characters (patterns) under investigation and utilize the structure to improve their recognition ability.

An example prior art system is shown in FIG. 1 to which reference is now made. It typically includes a digitizer 10, a segmenter 12, a feature extractor 14, a classifier 16 and a reference character database 18. The digitizer 10 converts an input pattern into a series of paired position (x,y) and sometimes also pressure P coordinates of sample points along the stroke. The segmenter 12 divides the input pattern into separate characters (i.e. if the input pattern was a handwritten "the", the segmenter 12 would divide the separate strokes into the characters "t", "h" and "e"). The feature extractor 14 extracts the features of each character and transforms each character into a standard format, called a "compressed model". The classifier 16 then compares the standardized input character against the standardized reference characters stored in the reference database 18. The reference character which has the best match, by some criterion or criteria, is output as the recognized character. U.S. Pat. No. 4,284,975 to Odaka and U.S. Pat. No. 4,607,386 to Morita et al. describe representative systems.

U.S. Pat. No. 4,040,009 to Kadota et al. describes a system which assumes a certain structure for the patterns being recognized and utilizes this knowledge to resolve ambiguities among characters that, from the compressed model, are indistinguishable otherwise. The classifier 16 of the system of Kadota et al. has two recognition phases. The first phase divides the reference characters into "confusion groups" where the members of each confusion group are indistinguishable from each other. In the second phase, an apriori pair-wise matrix of pair-wise specific features is created. Each pair-wise feature discriminates between a pair of reference characters based on the distance of each reference to the relevant feature. Other patents which describe this approach are U.S. Pat. Nos. 4,718,102 and 4,531,231, both to Crane et al.

Unfortunately, the criteria for recognizing confusion groups and for defining pair-wise features are based on the writing style of the particular reference characters in the database. As a result, the prior art systems cannot recognize characters which have a significantly different writing style.

U.S. Pat. No. 5,125,039 to Hawkins describes a system which records the occurrence of features in an unknown object and compares the result with dictionary entries for the reference characters. The dictionary entries indicate that, for the reference character, each feature either occurs or does not occur (i.e. they are binary features). The feature list of the unknown object is XOR'd with the feature list of each reference character and the unknown object is assigned the identity of the reference character to which it has the best XOR match.

SUMMARY OF THE PRESENT INVENTION

Applicants have realized that a) there are global parameters, such as lengths of strokes, and local parameters, such as locations of features of interest, and b) that all parameters are equally important in recognition. Furthermore, some parameters have a range of values and are not binary in nature. Recognition can be improved by utilizing these realizations with a multi-objective recognition criterion.

The list of parameters which the system identifies is not unique but the set of parameters should reasonably define the expected types of patterns and their expected variation. Possible parameters include the aspect ratio of the height of the pattern's bounding rectangle to its width and the relative length of the first stroke from pen-down to the first features of interest, such as a sharp angle change or a local minimum or maximum.

It is therefore an object of the present invention to provide a handwritten pattern recognition system having a plurality of parameter determining units, each determining the value of a desired parameter for an input pattern to be recognized. The system also includes a pattern match determiner which produces match values for each parameter of the input pattern with its corresponding parameter of each reference parameter. The match determiner also produces an overall match value for each reference pattern. A pattern classifier selects the reference pattern whose parameter set is "closest", by some matching criterion, to that of the input pattern.

Additionally, in accordance with a preferred embodiment of the present invention, the pattern classifier includes best candidate means for selecting the reference pattern with the smallest match value. Alternatively, the pattern classifier includes K nearest neighbor means which selects the group of reference patterns having the K smallest match values, divides the group into classes according to which type of pattern they represent and, if available, selects the class having the most reference patterns therein.

Moreover, in accordance with a preferred embodiment of the present invention, the parameters are local parameters, global parameters and stroke-based parameters.

Finally, in accordance with a preferred embodiment of the present invention, the input pattern is provided as a sequence of sample points.

BRIEF DESCRIPTION OF THE DRAWINGS

The present invention will be understood and appreciated more fully from the following detailed description taken in conjunction with the drawings in which.

DETAILED DESCRIPTION OF A PREFERRED EMBODIMENT

Figure 1:
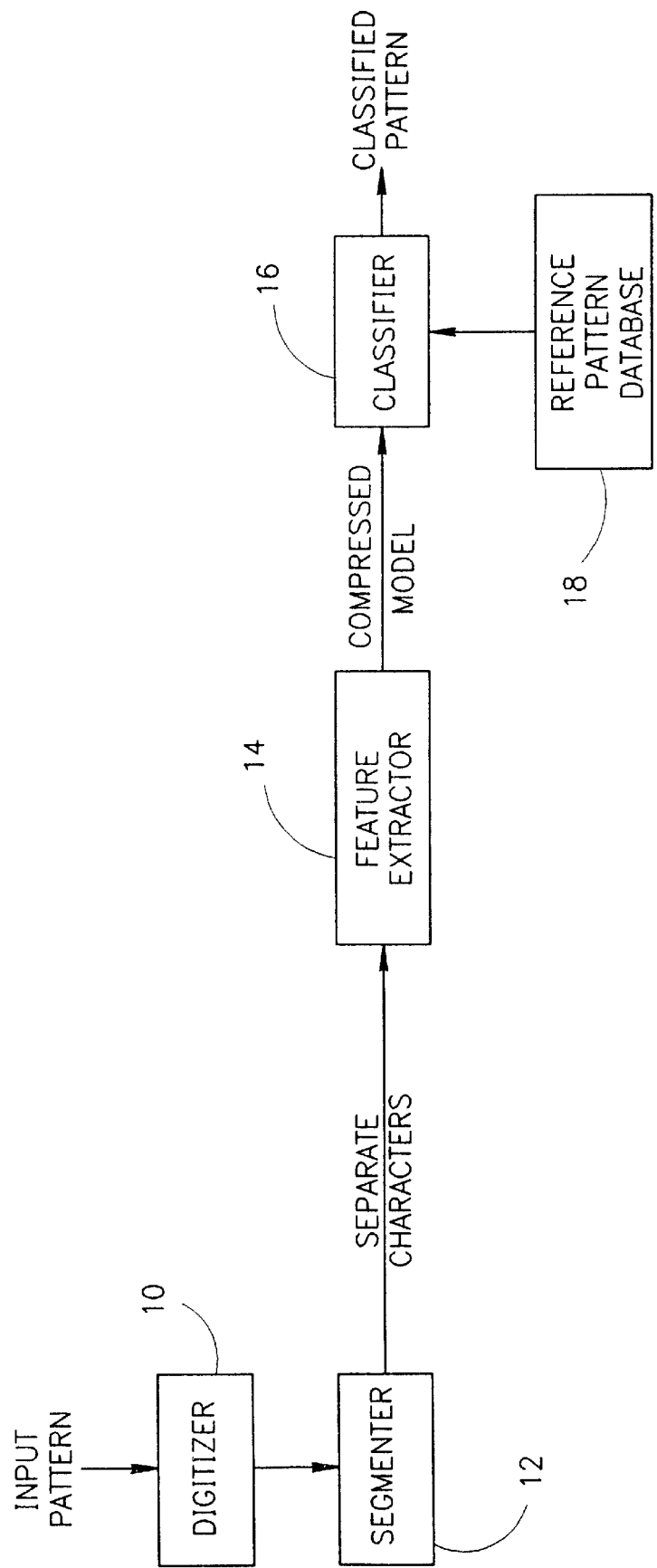
FIG. 1 is a block diagram illustration of a prior art handwritten pattern recognition system.
Figure 2:
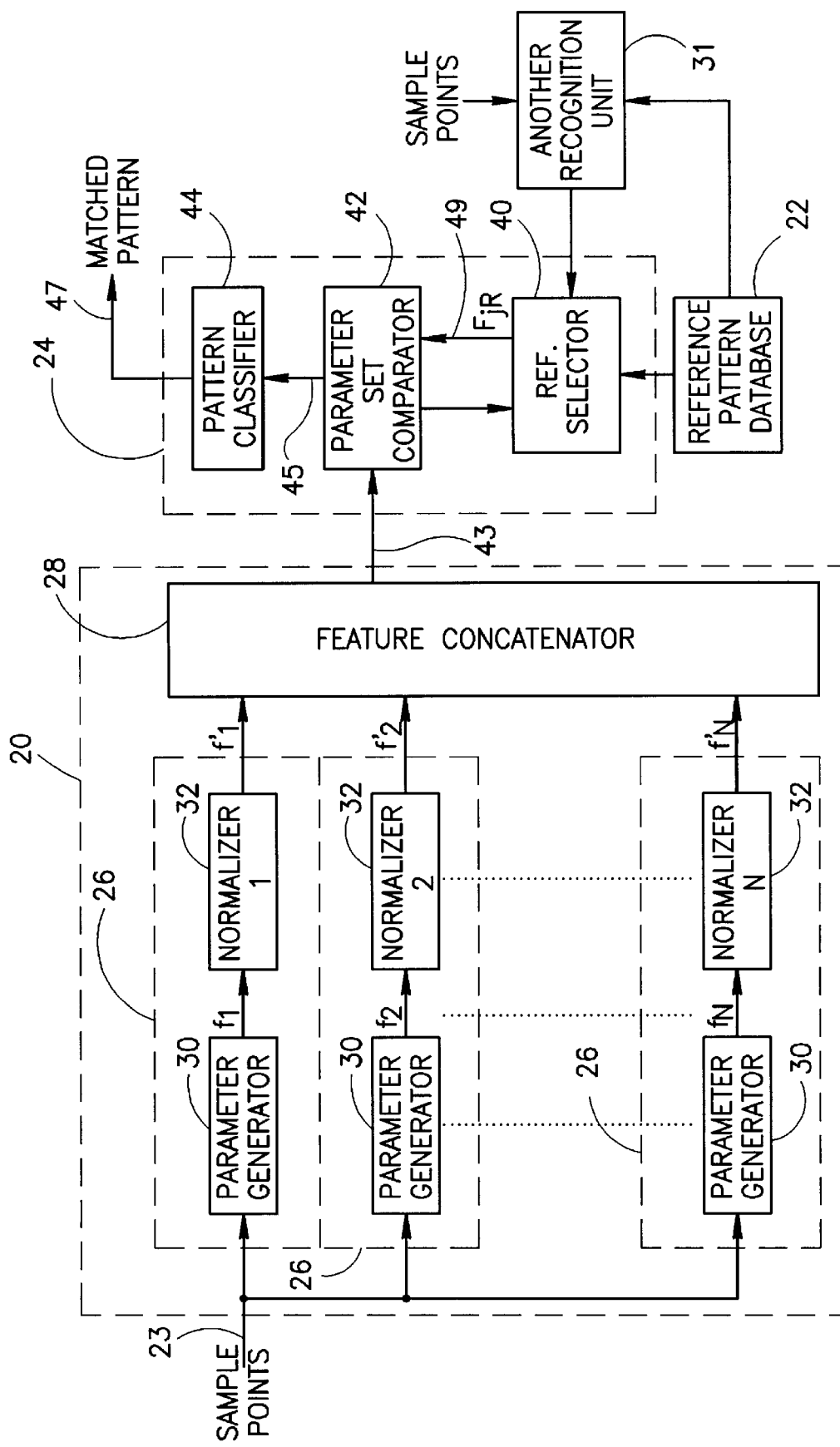
FIG. 2 is a block diagram illustration of novel parameter extraction and classification units forming part of a handwriting pattern recognition of the present invention.

The present invention is a handwritten pattern recognition system. As such, it comprises a digitizer 10 and a segmenter 12, as in the prior art. FIG. 2, to which reference is now made, details the elements of its parameter extractor, labeled 20, its reference pattern database, labeled 22, and its classifier, labeled 24.

The parameter extractor 20 receives sample points along line 23 from the segmenter 12. Parameter extractor 20 comprises a plurality of independent parameter determination modules 26, each determining a different parameter, such as length, aspect ratio, etc., of the input sample points, and a parameter concatenator 28 which produces a parameter set, on line 43, from the output of the modules 26.

Each parameter determination module 26 comprises a parameter generator 30 and a normalizer 32. The parameter generators 30 each generate a single parameter $f_i$ (which can have a range of values which include the null value) and the corresponding normalizer 32 normalizes the parameter $f_i$ (i varies from 1 to N, the number of parameters) to provide the parameters with some set of standard units. For example, each normalizer 32 normalizes its parameter $f_i$ with a pre-determined standard deviation value corresponding thereto. The standard deviation value for $f_i$ is produced by determining the value of the parameter $f_i$ for all reference patterns in a large reference database and taking the first standard deviation thereof. The output of normalizer 32 is a normalized parameter $f'_i$ and the output of the concatenator 28 is a parameter set $F(f'_i)$ whose elements, due to the normalization, are all in standard units and can thus, be compared.

The classifier 24 comprises a reference pattern selector 40, a parameter set comparator 42, and a pattern classifier 44. One at a time, the reference pattern selector 40 selects, from reference database 22, the reference parameter sets $F_j(f'_{j,i})$ (j varies from 1 to M, the number of reference characters) to be compared to the input parameter set $F(f'_i)$ produced by the parameter concatenator 28. The parameter set comparator 42 receives the reference parameter set $F_j(f'_{j,i})$ along line 49 and the input parameter set $F(f'_i)$ along the line 43 and compares the reference parameter set $F_j(f'_{j,i})$ with the input parameter set $F(f'_i)$. The parameter set comparator 42 produces, along a line 45, a comparison value for each reference parameter set $F_j(f'_{j,i})$. The pattern classifier 44 selects the reference parameter set $F_j(f'_{j,i})$ which is closest, by some match criterion described hereinbelow, to the input parameter set $F(f'_i)$. The reference pattern corresponding to the selected reference parameter set is put out, along line 47, as the matched pattern.

It will be appreciated that reference pattern selector 40 can select all of the patterns in the database 22 or it can select a portion thereof. For example, if another recognition unit 31 has already processed the input pattern and determined that a group of reference patterns are similar to the input pattern recognition unit 31 can so indicate to the reference pattern selector 40 and it can choose only those patterns of the group found by recognition unit 31.

In accordance with a preferred embodiment of the present invention, the parameters can be any type of parameters which describe the expected patterns. The parameter set should describe local and global features of patterns and/or of strokes of patterns in order to cover as much of the variations in handwriting as possible. For example, the difference between a u and a v is a local one, centered around the sharpness of the curve. Other differences, such as angle of the letters, are more global. By considering many possible features of patterns, the noise in handwritten patterns, caused by non-rigid hands or by sheer laziness in writing, affects the results to a lesser degree than if only certain types of criteria are utilized.

It is noted that the parameters are independent of each other and are processed in parallel. This is in contrast to the prior art which first sorts in accordance with the global conditions and only afterwards, considers local conditions.

Figure 3:
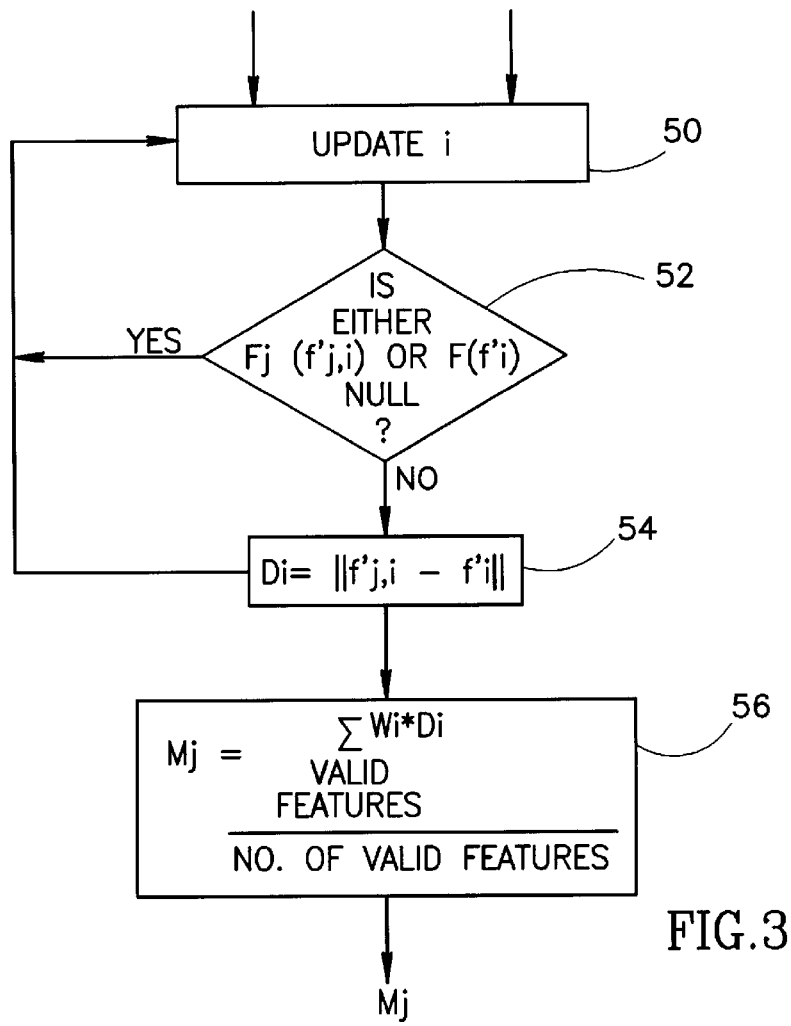
FIG. 3 is a flow chart illustration of the operations of a parameter set comparator forming part of the parameter extraction and classification units of FIG. 2.

FIG. 3 illustrates, in flow chart format, the operations of the parameter set comparator 42 for each reference parameter set $F_j(f'_{j,i})$. For each of the i=N normalized parameters $f'_i$, the parameter set comparator 42 first determines, in step 52, whether or not the normalized parameter $f'_i$ is null in the input parameter set $F(f'_i)$ or the reference parameter set $F_j(f'_{j,i})$. If one or both sets have a null value, the comparator 42 returns to step 50 and increments the value of i. Otherwise, in step 54, the Euclidean distance $D_i$ between the two normalized parameters $f'_{j,i}$ and $f'_i$ is determined. The process is repeated for all of the N normalized parameters.

Although the parameters are independent, they are not all equally sensitive measures of shape. Therefore, they are combined together in a weighted fashion to produce the match value $M_j$. This occurs in step 56 which defines the match value $M_j$ as a weighted and normalized sum of distances $D_i$ over the set of valid normalized parameters. Thus, $M_j$ is defined as:

$$M_j = \frac{\sum_{i=\text{valid}} W_i D_i}{\text{No.-of-valid-features}} \quad (1)$$

The weights $W_i$ are determined by an off-line optimization process performed on a very large number of reference characters. The process optimizes the quality of the recognition by selecting the weighting of the parameters.

Figure 4A:
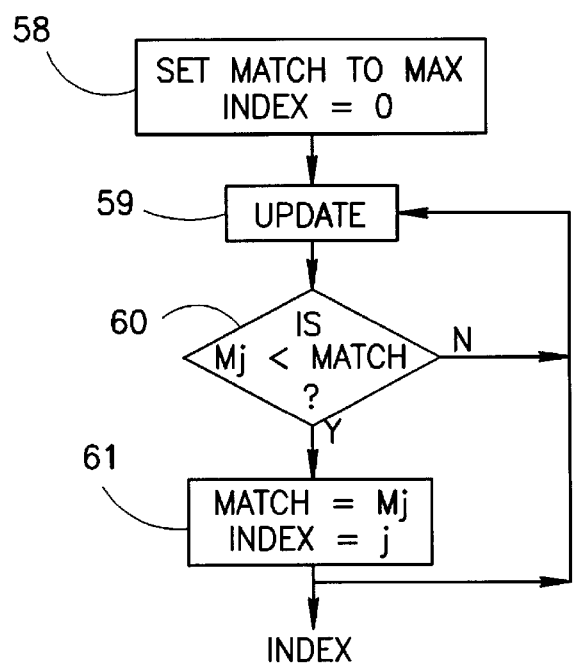
FIGS. 4A and 4B are flow chart illustrations of the operations of a pattern classifier forming part of the parameter extraction and classification units of FIG. 2.
Figure 4B:
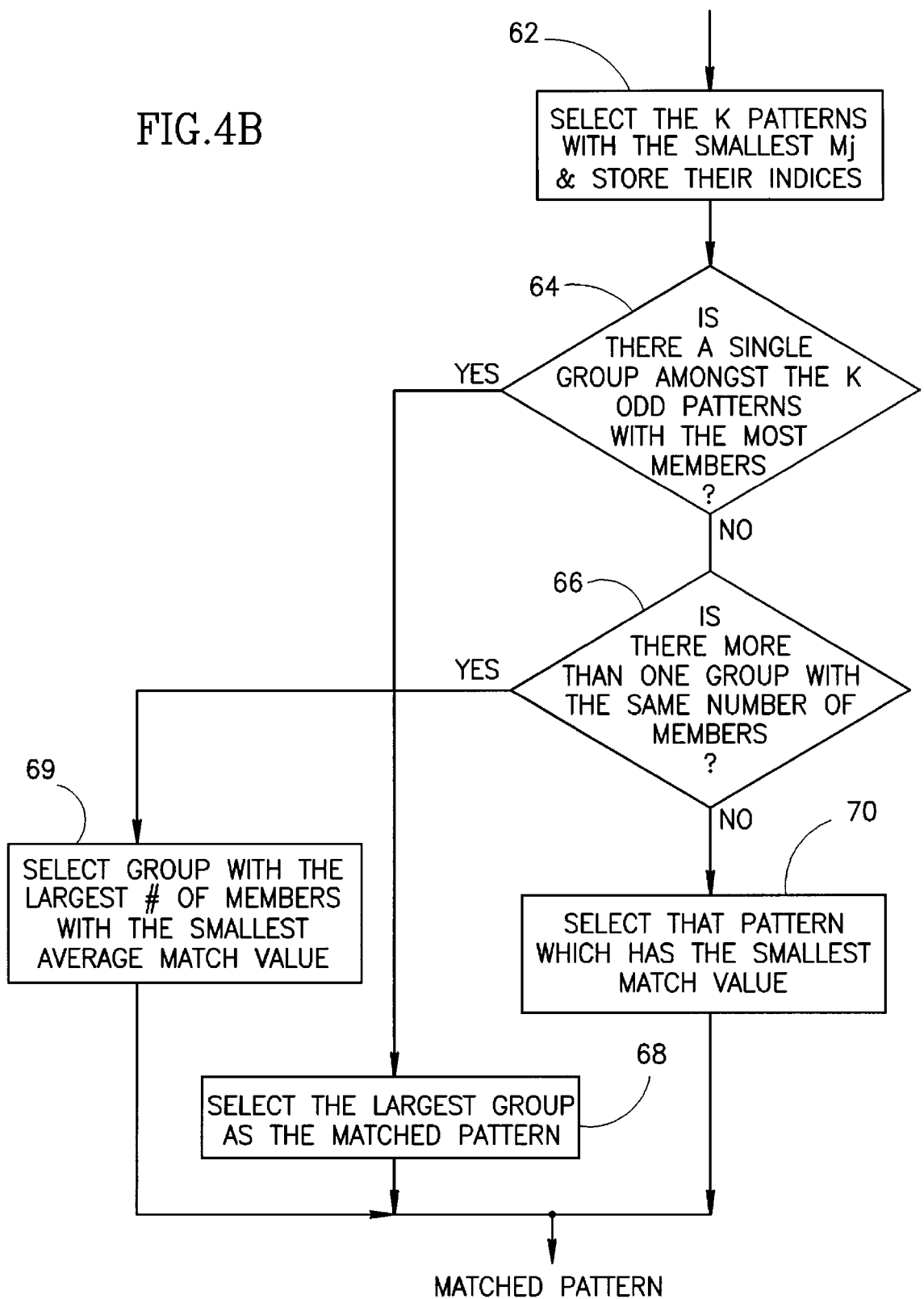

Pattern classifier 44 selects, among the match values $M_j$, the pattern which best matches the input pattern in accordance with some voting procedure. Two exemplary classification procedures are illustrated in FIGS. 4A and 4B. FIG. 4A illustrates a "best candidate voting scheme" and FIG. 4B illustrates a "group voting scheme".

The best candidate scheme described in FIG. 4A is simply the selection of the smallest match value and the production of the reference pattern having the corresponding index. The specific steps involve initializing the INDEX and MATCH values (step 58), looping over j (step 59), comparing $M_j$ to the current value of MATCH (step 60) and storing (step 61) $M_j$ in MATCH and j in INDEX only if $M_j$ is smaller than the current value of MATCH. The value of INDEX once the loop on j has finished is the index of the reference pattern with the best match.

The voting scheme of FIG. 4B assumes some noise in the match values and attempts to reduce its effect by selecting the best K candidates having the K lowest match values $M_j$. The K candidates are reviewed to determine if there is any group of candidates which are different versions of the same pattern. The matched pattern is that pattern which has the largest group. This method is also known as the "K Nearest Neighbor" method and is described in the article by Fukunanga, K. and Hostetler, L. D., "K-Nearest Neighbor Bays Risk Estimation", *IEEE Transactions on Information Theory*, IT-21, 1975, p. 285, which article is incorporated herein by reference.

The specific steps shown in FIG. 4B are:
a) selecting (step 62) the K, where K is odd, patterns with the smallest match value $M_j$ and storing their indices j in a manner similar to that described with reference to FIG. 4A,
b) reviewing (step 64) the K patterns to determine if there is a single group which has the most members;

c) if there is a single group, selecting (step 68) one of the patterns in the group as the representative matched pattern;

d) if not, determining (step 66) if there is more than one group with the same number of members;

e) if not, selecting (step 70) the pattern with the smallest match value;

f) if yes, selecting (step 69) the group which is the largest group with the smallest average match value.

As mentioned before, the parameters can be any types of parameters which describe the expected patterns. With reference to FIGS. 5A, 5B, 5C, 5D, 5E and 5F, the following is an exemplary set of parameters useful for identifying alphanumeric characters.

The first and second parameters are the ratio between the length of the first stroke and the length of its projection on the horizontal and vertical axes, respectively. A stroke is defined as the sample points between the pen-down and pen-up points.

Figure 5A:
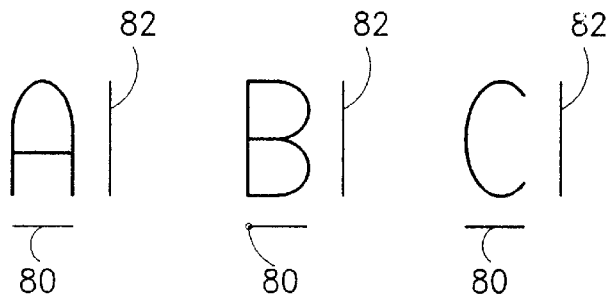
FIGS. 5A, 5B, 5C, 5D, 5E and 5F are illustrations of letters indicating various elements useful in determining parameters.

FIG. 5A shows three letters, A, B and C, and their projections 80 and 82 on the horizontal and vertical axes, respectively. Since the letters are approximately the same height, their projections 82 on the vertical axis are approximately equal. However, along the horizontal axis, their projections 80 are very different. In fact, the horizontal projection 80 of the first stroke of the letter B is just a point.

The first and second parameters are formally defined as:

$$f_1 = \frac{\text{length-of-first-stroke}}{(x_{\max} - x_{\min})} \quad (2)$$

$$f_2 = \frac{\text{length-of-first-stroke}}{(y_{\max} - y_{\min})} \quad (3)$$

The third parameter is defined as the ratio of the lengths of the first and second strokes, or:

$$f_3 = \frac{\text{length-of-first-stroke}}{\text{length-of-second-stroke}} \quad (4)$$

The fourth parameter is defined as the length of the portion of the first stroke beginning at the pen-down point and ending at the first feature of interest, such as a sharp angle change, a local maximum or minimum or any other pre-defined feature. The fifth parameter is defined as the length of the portion of the first stroke beginning at the pen-up point and moving backwards to the last feature of interest.

Figure 5B:
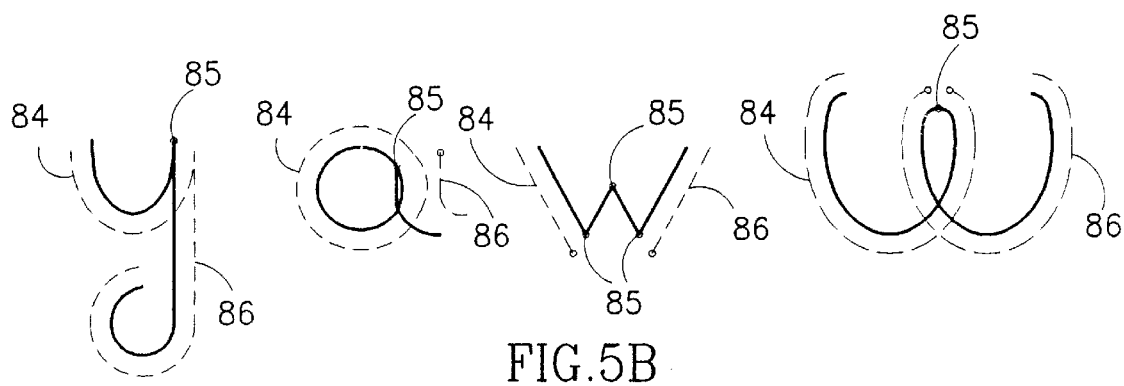

These parameters are illustrated in FIG. 5B which shows the letters y, a, W and w. The fourth parameters are labeled 84, the fifth parameters are labeled 86 and the features of interest are labeled 85. For the letters y and a, which have one sharp angle change 85, the fourth and fifth parameters 84 and 86 end at the same point. The letter W has three sharp angle changes and the letter w has one local maximum.

The sharp angle change can be defined in any appropriate manner. In one embodiment, it is determined by reviewing values of the local tangent angles at each sample point and select the sample point whose neighbors have significantly different tangent angles. The local maximum or minimum is defined as any point whose y or x coordinate is either larger or smaller, respectively, than those of the preceding and succeeding J points, where J is typically four.

The formal definitions for the fourth and fifth parameters are:

$$f_4 = \sum_{\text{pen-down}}^{\text{first-feature-of-interest}} \Delta l \quad (5)$$

$$f_5 = \sum_{\text{pen-up}}^{\text{first-feature-of-interest}} -\Delta l \quad (6)$$

where $\Delta l$ is the distance between neighboring sample points.

Figure 5C:
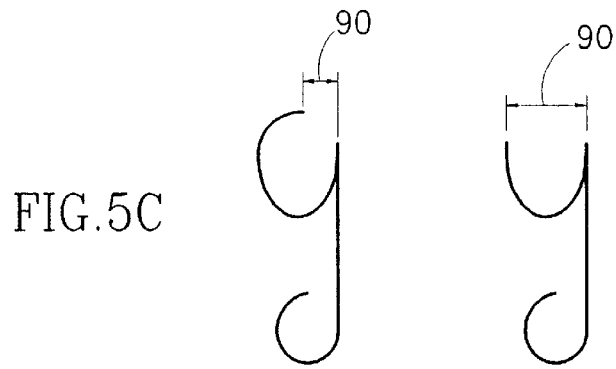

The sixth parameter is the distance in the horizontal direction, between the pen-down point and the first feature of interest of the first stroke. This is shown in FIG. 5C for the letters y and g and is labeled 90. The parameter is defined as:

$$f_6 = \|x_{\text{pen-down}} - x_{\text{first-feature-of-interest}}\| \quad (7)$$

Figure 5D:
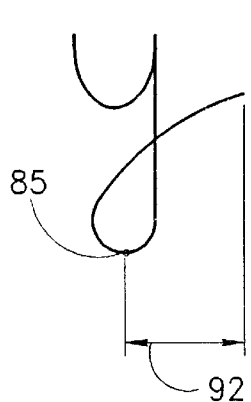

The seventh parameter, shown in FIG. 5D by reference numeral 92, is the distance along the horizontal direction between the pen-up point and the last feature of interest in the vertical direction of the first stroke or:

$$f_7 = \|x_{\text{last-feature-of-interest}} - x_{\text{pen-up}}\| \quad (8)$$

Figure 5E:
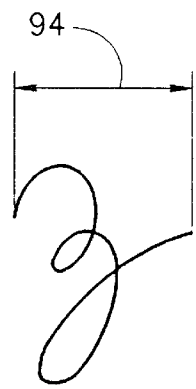

The eighth parameter, shown in FIG. 5E and labeled 94, is the distance along the horizontal axis between the pen-down and pen-up points of the first stroke, or:

$$f_8 = \|x_{\text{pen-down}} - x_{\text{pen-up}}\| \quad (9)$$

The ninth and tenth parameters are similar to the fourth and fifth parameters but for the second stroke. If there is no second stroke parameters 9 and 10 receive null values. Similarly, for any of the above parameters, if the stroke has no feature of interest, the parameter receives a null value.

Figure 5F:
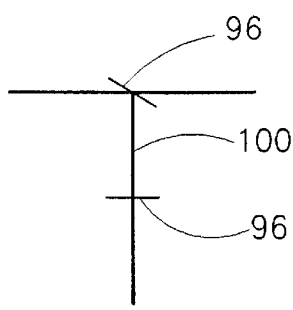

The eleventh parameter is defined as the distance between the centers of the first two strokes. The letter T is shown in FIG. 5F and the centers of the first and strokes are labeled 96 and 98, respectively. The distance between them is labeled 100. Formally, parameter 13 is defined as:

$$f_{11} = \sqrt{\left(x_{cg}^{\text{first-stroke}} - x_{cg}^{\text{second-stroke}}\right)^2 + \left(y_{cg}^{\text{first-stroke}} - y_{cg}^{\text{second-stroke}}\right)^2} \quad (10)$$

The final parameter, parameter 12, is defined as the ratio between the overall height of the pattern to its width, or:

$$f_{12} = \left(\frac{y_{\max} - y_{\min}}{x_{\max} - x_{\min}}\right)_{\text{whole-pattern}} \quad (11)$$

It will be appreciated that other parameters can also be included and that not any or all of the above-described parameters have to be included.

It will be appreciated by persons skilled in the art that the present invention is not limited to what has been particularly shown and described hereinabove. Rather the scope of the present invention is defined by the claims which follow:

What is claimed is:

1. A handwritten pattern recognition system for recognizing an input pattern, the system comprising:

a. a first plurality of independent parameter determination modules, each receiving said input pattern, for determining a parameter vector for said input pattern;
b. a reference pattern database storing a multiplicity of reference parameter vectors associated with a multiplicity of reference patterns, wherein said reference patterns include a plurality of types of patterns and more than one version of each type of pattern;
c. a parameter match determiner for determining a parameter match value of each input parameter with its corresponding parameter of said reference parameter vectors and for producing overall match values for at least selected ones of said reference parameter vectors as a weighted function of said parameter match values for each reference parameter in said selected reference parameter vectors; and
d. a pattern classifier for classifying said input pattern as one of said types of reference patterns wherein said pattern classifier includes K nearest neighbor means for selecting a group of reference patterns having the K smallest match values, for dividing said group according to type of patterns represented in said group and for classifying said input pattern as a type of pattern having the most members in said group.

2. A system according to claim 1 and wherein said parameter determination modules comprise parameter generators and normalizers.

3. A system according to claim 1 and wherein said input pattern is provided as a sequence of sample points.

4. A system according to claim 1 and wherein said parameters include the length of a stroke from pen-down to the first feature of interest.

5. A system according to claim 1 and wherein said parameters include the length of a stroke from pen-up back to the last feature of interest.

6. A system according to claim 1 and wherein said parameters include the horizontal distance from pen-down to the first feature of interest.

7. A system according to claim 1 and wherein said parameters include the horizontal distance from pen-up back to the last feature of interest.

8. A system according to claim 5 and wherein said features of interest comprise at least one of local vertical minimum, local vertical maximum, local horizontal minimum, local horizontal maximum and sharp angle change.

9. A system according to claim 1 and wherein said parameters include the ratio of the length of a stroke to its projection on one of the horizontal and vertical axes.

10. A system according to claim 1 and wherein said parameters include the ratio of the lengths of the first two strokes of one pattern.

11. A system according to claim 1 and wherein said parameters include the distance between the centers of the first two strokes of one pattern.

12. A system according to claim 1 and wherein said parameters include the aspect ratio of the pattern.

13. A system according to claim 1 and wherein said reference pattern database is a portion of said database as selected by another handwriting recognition unit.

\* \* \* \* \*